United States Patent [19]
Etani

[11] Patent Number: 4,880,547
[45] Date of Patent: * Nov. 14, 1989

[54] METHODS FOR WATER TREATMENT

[76] Inventor: Kenji Etani, 26 Clinton Dr. #112, Hollis, N.H. 03049

[*] Notice: The portion of the term of this patent subsequent to May 28, 2002 has been disclaimed.

[21] Appl. No.: 169,230

[22] Filed: Mar. 16, 1988

Related U.S. Application Data

[60] Continuation-in-part of Ser. No. 93,186, Sep. 4, 1987, Pat. No. 4,775,485, which is a division of Ser. No. 488,597, Apr. 22, 1983, Pat. No. 4,692,314, which is a continuation-in-part of Ser. No. 40,302, May 18, 1979, abandoned, which is a continuation-in-part of Ser. No. 934,425, Aug. 17, 1978, abandoned, which is a continuation of Ser. No. 717,514, Aug. 25, 1976, abandoned, which is a continuation-in-part of Ser. No. 591,536, Jun. 30, 1975, abandoned.

[51] Int. Cl.$^4$ .............................. C02F 1/56; C02F 1/76
[52] U.S. Cl. ..................................... 210/728; 210/749; 210/754; 210/759; 210/764; 422/265
[58] Field of Search ............... 137/268; 210/716, 728, 210/732-736, 749, 753-756, 758, 759, 764, 169, 192, 198.1; 239/310-318; 422/264-266

[56] References Cited

U.S. PATENT DOCUMENTS

| | | | |
|---|---|---|---|
| 429,384 | 6/1890 | Manwarnig | 422/265 |
| 2,580,809 | 1/1952 | Marks et al. | 210/753 |
| 2,826,484 | 3/1958 | Buehler | 422/265 |
| 3,232,869 | 2/1966 | Gard | 210/753 |
| 3,633,538 | 1/1972 | Hoeflin | 422/265 |
| 3,677,408 | 7/1972 | Dinzo | 210/169 |
| 3,684,460 | 8/1972 | Arneson | 422/265 |
| 3,690,860 | 9/1972 | Salutsky | 210/916 |
| 3,706,140 | 12/1972 | Brillond | 422/265 |
| 3,846,078 | 11/1974 | Brett | 422/264 |
| 3,924,807 | 12/1975 | Morgan | 422/265 |
| 3,953,330 | 4/1976 | Tonkyn et al. | 210/728 |
| 4,519,914 | 5/1985 | Etani | 210/696 |
| 4,692,314 | 9/1987 | Etani | 422/265 |

Primary Examiner—Peter Hruskoci
Attorney, Agent, or Firm—Jack Larsen; Gilbert L. Wells

[57] ABSTRACT

For water treatment systems it may be desired to feed various chemicals at optimum rates into the system. Improvements over the invention of U.S. Pat. No. 4,519,914 and also to the novel feeder capsules employed are a shown.

The rate of feeding depends upon the size and number of small holes which are provided, or the user pokes through the shell of the capsule, and upon the flow rate of the water around it. In some embodiments the capsule is weighted to direct the small holes upward as it rests in quiet water, thereby substantially to halt the flow of chemical; but as the water is sloshed about in use, the chemical is dispensed at a rate proportional to the amount of use.

In a so-called "dumbbell" capsule the vertical tendency is aided by a second vented floatation sphere snapped to the first to hold the dispensing holes upward even in a hot tub. It is used in the controlled release of free bromine by the oxidant, sold under the trademark "OX-ONE".

In the preferred embodiment, a new composition of alum and low molecular-weight cationic polymeric flocculant is dispensed in a novel sphere, blow-molded with stub wings, which is a safe, effective, and attractive package for the chemicals.

9 Claims, 3 Drawing Sheets

METHODS FOR WATER TREATMENT

CROSS-REFERENCE TO RELATED APPLICATIONS

The present application is a continuation-in-part of application Ser. No. 07/093,186 filed Sept. 4, 1987 now U.S. Pat. No. 4,775,485, issued Oct. 4, 1988, which in turn is a division of application Ser. No. 488,597, now U.S. Pat. No. 4,692,314, issued Sept. 8, 1987, which was a continuation-in-part of application Ser. No. 040,302 filed May 18, 1979, which, in turn was a continuation-in-part of Ser. No. 934,425, filed Aug. 17, 1978, now abandoned, which was a continuation of application Ser. No. 717,514 filed Aug. 25, 1976, which is now abandoned and was a continuation-in-part of my application Ser. No. 591,536, filed June 30, 1975, and now abandoned. U.S. Pat. No. 4,519,955 issued Apr. 23, 1985 on application Ser. No. 349,920, which was a continuation-in-part of application Ser. No. 40,302. U.S. Pat. No. 4,519,914 issued May 28, 1985, and U.S. Pat. No. 4,530,120 issued July 23, 1985 on applications which were divisions of the above-referenced application Ser. No. 040,302.

BACKGROUND OF THE INVENTION

This invention relates to water quality and more particularly to methods and apparatus for feeding controlled amounts of chemicals such as chelating agents, perfumes, microbiocides and filtration aids to hot tubs, spas, cooling towers, swimming pools, and the like. Particularly this application relates to novel dispensing capsules for such methods. In home swimming pools, and in spas and hot tubs, it is almost always necessary to filter and recirculate the water and to add certain chemicals to aid filtration to improve the quality, appearance, and odor of the water.

This application is concerned with the packaging of such chemicals and will be understood in relationship to the above-cited patents and co-pending application and the related inventions disclosed therein, and as needed disclosed herein to set forth the utility, preferred embodiments, and preferred modes of practicing the invention as claimed herein.

U.S. Pat. No. 4,519,914 relates particularly to the method of the invention for treating swimming pool water. U.S. Pat. No. 4,530,120 relates to methods and apparatus of the invention relating to bathing systems wherein the feeder capsule is placed in the skimmer basket or other "intermediate-velocity chamber" and the chemical is extracted by the flow as water is pumped through the chamber causing the capsule to move about and stir its contents., U.S. Pat. No. 4,692,314 relates to more generic uses of the capsules with air washers, cooling towers, and the like wherein the chemical is extracted by flow; but in a different kind of intermediate-velocity chamber, and further disclosed uses in which the feeder is weighted so that in conditions of no flow, feeding is not just reduced, but substantially cut off, and also uses wherein the flow is generated by random sloshing around in use. Co-pending application Ser. No. 07/093,186 relates to such generic aspects of the invention viewed as methods, while the present application claims embodiments of the feeder capsules of the invention which are novel and uniquely fitted for the practice of the inventions claimed in the above-referenced patents and pending application.

SUMMARY OF THE INVENTION

This application relates especially to different forms of feeders and their modes of operation. My U.S. Pat. No. 4,530,120, for example discloses four different embodiments for the generally spherical feeder capsules of the invention. Different combinations of the disclosed features, suggest other embodiments, and yet others were disclosed in application Ser. No. 717,514, and will be obvious to those skilled in the art. A feeder for the invention as claimed in U.S. Pat. No. 4,692,314 need only be "close enough to spherical in shape and close enough to neutral in buoyancy" dependent on water velocity that the flow causes the feeder to move about freely and roll. The practice of the invention has shown that a blow-molded sphere of high density polyethylene, about 2¾ inches in diameter with a pair of stub wings at the equator, and a filling hole at a pole has been the preferred package for the great majority of uses for the invention. It is, acordingly a primary object of the invention as embodied in the present application to provide a feeder capsule that is convenient and safe to handle at all stages of its use, that may be readily imprinted with necessary warning and instruction labels, that is safe for storage and shipment, functional in use, and that provides means for meeting the utilitarian requirements of the use, in a neat, orderly, and attractive way.

It is a further object of this invention to provide an improved feeder for a chemical such as a composition of potassium monopersulfate, alternatively designated "potassium peroxymonosulfate, KHSO5", made and sold by the DuPont Company under its registered trademark "OXONE", hereinafter designated "OXONE". As commercially available, this composition is readily loaded into the blown-sphere feeder capsules, but, because of a magnesium carbonate anticaking additive, the composition clogs the small feeder holes.

To prevent overturning in use, and consequent overdosing or feeder-hole clogging, the feeder is joined to a second plastic sphere which provides a strong flotation and an alternate mode of operation for the novel feeder as disclosed in the above-cited patents.

Accordingly it is a further object of the invention to provide for the safe convenient, simple, neat, orderly, and attractive shipment and use of OXONE and chemicals with like properties in water treatment, particularly in bathing systems.

It has been found that the new capsules have many uses. In swimming pools, in addition to alum for filtration, the feeders may be used to add flocculants, chelating agents microbiocides, germicides, and pH-adjusting chemicals by introducing appropriate capsules into the skimmer or strainer basket. A thin film of cetyl alcohol or isocetyl alcohol to limit evaporation, or a thin film of perfume oils may be maintained on the pool surface by floating a capsule in the pool that responds to the wave action of pool use to replenish the films.

In hot tubs and spas where the water is vigorously agitated by air and water jets, the chemicals may be administered by dropping the capsules directly into the tub with the bather. In most cases it will be preferred to treat via the skimmer or strainer baskets which are present in typical American spas and hot tubs.

As more fully set forth in U.S. Pat. No. 4,692,314, cooling towers and air washers are treated by addition of microbiocides for algae and bacteria, and chemicals for inhibiting corrosion and scale formation. In each case, a capsule is introduced into the water collecting basin, or into the strainer, or other chamber with sufficient depth, and the chemical is extracted by the flow. The accumulation of fuel on the bilge water of power boats presents a serious fire hazard which is reduced by adding a capsule of nonionic emulsifier, which is released slowly as the capsule rolls around when the craft is under way. Any fuel which may be present is dispersed in the bilge water with a reduction of both flammability and fire potential, and for household plants, nutrients may be administered from a capsule dropped into an ordinary sprinkling can, the capsule being arranged to release the chemical only as the water is sloshed about all as more fully set forth in the above-cited U.S. Pat. No. 4,692,314.

Small amounts of agricultural chemicals can be applied to lawns, trees, and shrubs using a garden hose connected through an "intermediate-velocity chamber" designed to accept capsules and also designed to dispense the chemicals into the flow in a controlled manner, as more fully disclosed and explained in U.S. Pat. No. 4,512,955.

BRIEF DESCRIPTION OF THE DRAWINGS

The Invention, accordingly, lies in the new methods and the novel arrangements which include dispensing containers which are adapted to, and contribute to, the success of the methods. The Invention in its various aspects will, therefore, in part be obvious and, in part will be apprehended from the following specifications in conjunction with the annexed drawings, of which.

DESCRIPTION OF THE PREFERRED EMBODIMENTS

Figure 1:
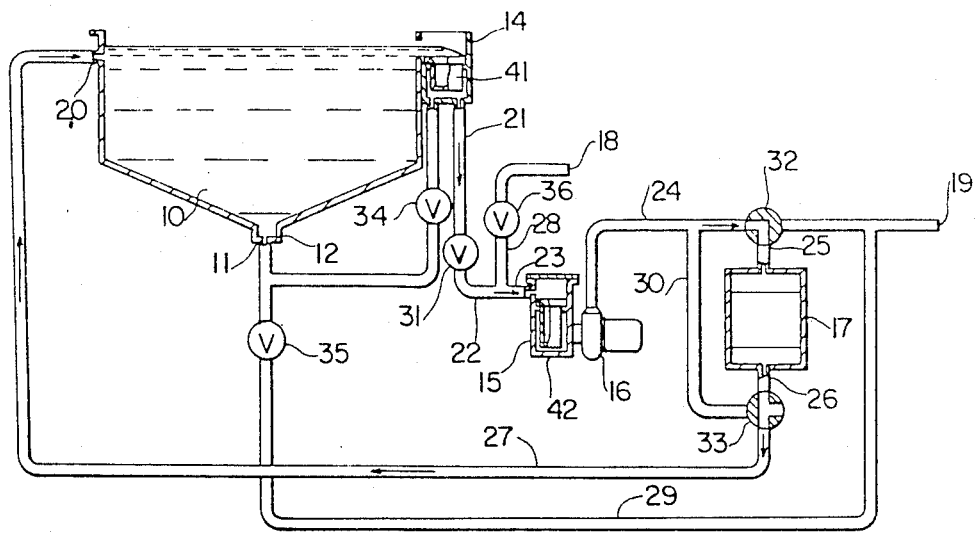
FIG. 1 is a schematic diagram of a typical home swimming pool system as used for the invention.

As indicated in FIG. 1, a typical swimming pool comprises a pool 10, which has a drain 11 and sump 12 at the bottom of the pool, a skimmer 14 which carries away overflow and collects floating debris, a strainer 15 at the inlet to a pump 16, a filter 17, a water main 18, source of fresh water, a system outlet 19, and a pool inlet 20. Pipes 21-30 and valves 31-36 connect all.

In normal operation, water is taken from the pool through the skimmer 14, the pipe 21, the valve 31, pipes 22 and 23, strainer 15, pump 16, pipe 24, valve 32, pipe 25, filter 17, pipe 26, valve 33, and pipe 27 back to the pool inlet 20. Valve 34 allows water to be recirculated in whole or in part from the bottom drain 11, and valve 35 allows water to be gravity-dumped through the pipe 29 to the system outlet 19. Valve 36 connects the main 18 to replenish through pipes 28 and 23. The valves 32 and 33 may be turned to backwash the filter 17 via the pipe 30. The skimmer 14 is arranged to collect leaves and other floating debris. To prevent the plugging of the pipes 21, 22, 23, and the pump 16, the skimmer 14 has a perforated basket 41 of larger diameter and the strainer 15 has a strainer basket 42. While the flow velocity in the baskets is much less than that in the pipes, it is still perceptible and non-uniform so that when a container of chemical of the kind shown in FIGS. 2 to 5 is dropped into the perforated basket in the skimmer or into the strainer basket it bobs or flutters with the flow through the baskets.

The dry chemical capsule is placed in the strainer basket with the feed hole or holes in upward position. When the pump is in operation and after the water enters the capsule through its small feed hole or holes, the chemical nearest to the hole or holes dissolves first and three layers form within the capsule, i.e., the pocket of entrapped air or gas at the top, the chemical solution in the middle, and the yet undissolved solid chemical in the bottom. When the pump is turned off and there is no water flow through the strainer chamber, the capsule is in repose with the feed hole side upward and the heavier solid downward. Chemical feeding into the system, except by diffusion, is stopped. When the pump is turned on, the capsule rolls with the water current and the solution is released through the feed hole or holes and is rapidly mixed with water. The yet undissolved chemical remains in the bottom of the capsule. The capsule delivers the chemical at substantially a constant rate until the amount of chemical is expended. When the chemical is nearly dispensed, the capsule becomes lighter and floats and spins in the strainer.

As mentioned above, the feeder may be inserted at these places or a special chamber. We may call these generically "intermediate velocity chambers" and they must have a cross-sectional area at least twice that of the feeder so the feeder does not obstruct the flow, and should not be greater than one hundred times the feeder cross-section, if there is to be a perceptible stream velocity.

Figure 2:
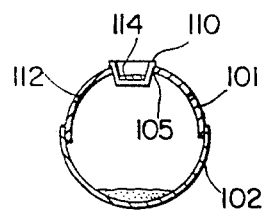
FIG. 2 is a drawing of a section through a form of the dispensing container of the invention, approaching depletion of the chemical.

FIG. 2 is representative of a practical embodiment for a dispensing container for coagulants, hereinafter termed a "feeder". The feeder comprises two plastic hemispheres 101, 102, which are joined together in the manner of some table tennis balls with cement. The hemisphere 101 designated the upper hemisphere, has a filling hole 105, which is closed by a plug 110. For dispensing the chemical, there are a number of small holes 112 in the hemisphere 101. The plug 110 has a porous buoyant portion 114.

Figure 3:
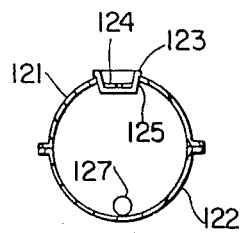
FIG. 3 is a drawing of an alternative construction of the container, as preferred in some uses, shown empty.

FIG. 3 represents a construction in which upper and lower hemispheres 121 and 122 are joined at a flange. The thermoplastic hemispheres with flanges can be made easily by the vacuum forming process. This is the preferred construction when polyvinyl chloride (PVC) is used, or when the filling chemical is compressed into a solid ball "brickette". The flange closure is readily achieved by ultrasonic welding, and the flange assists the rotation of the feeder in the eddies of flow. It also facilitates the handling and packaging of the feeders. The body of chemical, or an added weight 127 tends to stabilize the upward orientation of the feeder holes in conditions of low flow. A filling hole 125 is closed by a plug 123 which has a porous buoyant portion 124.

Figure 4:
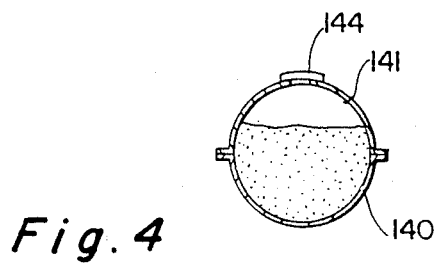
FIG. 4 is a drawing of a second alternative construction with a nonrefillable closure.

FIG. 4 represents an alternate closure of the feeder of FIG. 3. In this construction the feeder is filled by the supplier with a desired quantity of chemical 140, leaving an empty space 141, and sealed with a patch 144. The empty space may be filled with inert gas for chemicals which may be degraded in the presence of air or moisture. With this construction, the user must make the proper number of dispensing holes by piercing the feeder with a needle or the like.

Figure 5:
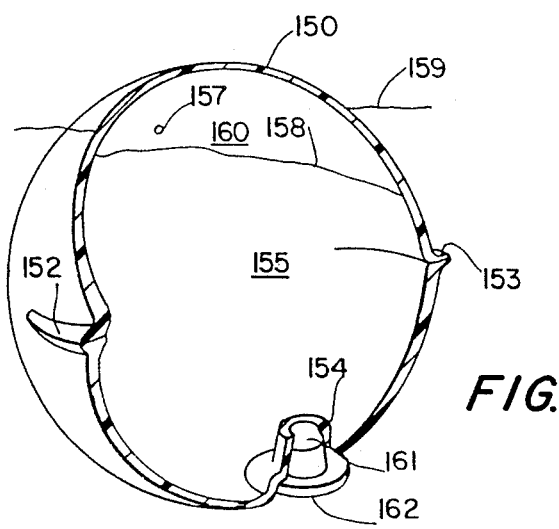
FIG. 5 is a cut-away view of the form of container preferred in most uses.

FIG. 5 is a cut-away drawing of the capsule configuration preferred for most swimming pool and spa uses. The sphere is blow-molded of high density polyethylene. Twenty-two grams of the polymer are needed for a sphere 2 ¾ inches in diameter. The shell 150 varies somewhat in thickness between about one-sixteenth and one-eighth of an inch. The mold is made in two parts. When molding is complete the sphere is left with a pair of stub wings 152 and 153 which serve the function of the flange in the configuration of FIG. 3.

In preparation for filling, the filling hole 154 which had been formed in the mold is cleanly cut through using an ultrasonic tool. The figure represents the capsule as filled with an emulsion 155 of perfume oil, mineral oil, isopropyl myristate and a spreading agent. It is desired that this capsule float with each dispensing hole 157 near the liquid level inside 158 and outside 159 the capsule when it is resting in still water. To achieve this result, an air space 160 is left after filling with the emulsion, and a zero gauge buck shot 161 is swaged into the filler plug 162.

As in the case of the composition just described, it is possible to dispense oil-soluble chemicals into water without creating an oily film on the water by means of the invention. The oil with dissolved chemical is added with emulsifying agent and some water to the capsule as above; but, sometimes, the emulsion tends to separate into three layers, i.e., oil at the top, emulsion in the middle, and water at the bottom. When this happens, it may be desirable to place the feed hole at the bottom of the capsule near the weight 161. When the capsule is violently agitated the emulsification is complete. When it is quiet enough for separation, both the oil and the flotation bubble are completely contained by an intervening layer of water between them and the dispensing hole or holes.

A dry granular chemical can also be introduced through the filling hole 154 into the shell 150, and then the plug 162 without weight 161 is welded over the hole. This makes the capsule child-proof prior to use. This is important from a practical point of view for swimming pool and spa and hot tub use, because it enables the packager to offer a completely sealed capsule for dry chemicals used in swimming pools and spas, some of which are hazardous chemicals.

For a number of years I have supplied my Type A capsule, (see below) filled with dry powders. Remarkably improved performance is achieved when alum is combined with a liquid cationic polymer (see Type B below). The dry granular alum is first introduced, into the feeder, then a measured quantity of liquid cationic polymer flocculant is added so that the alum takes up all of the the water from the solution by hydration, leaving a dry mass which may cling to the bottom of the capsule. Accordingly the feeder operates as described for a dry chemical capsule in the explanation of FIG. 1, above. As an example, about 50 grams of low-molecular-weight, liquid, cationic, polymeric flocculant, which is 50% water, i.e., Magnifloc 572C made by American Cyanamid, is added to a 2.75 inch diameter capsule containing 150 grams of granular aluminum sulfate. This is just enough to saturate the alum. The lump, so formed, acts nicely as a weight during usage. When the water flow surrounding the capsule ceases, the chemical solution dispensing essentially stops.

A 2 ¾ inch diameter feeder as shown in FIG. 5 with a 15 mm. diameter closure cap, charged as just described has been tested in three modes of operation with good results:

First, the capsule was filled with water, the cap replaced, then placed in a pool skimmer basket. With the filter pump running, intermittently in normal usage, the capsule lasted about three weeks, the pool retaining crystal clarity.

In a second test, the filling cap was left off for a maximum rate of feeding. The chemical lasted two days.

In the third test, the capsule was inserted into the pump strainer basket, where with higher velocity, the chemical was dispensed in less than three hours, leaving the pool polished.

In addition to convenience and improved performance, this type of feeder offers additional advantages: First, safety, the chemicals, neither the liquid nor the powder is free to escape the container, in shipment or in the hands of a child, or the mouth of a family pet.

Secondly, the slight possibility that feed holes may be clogged by granules of chemical is eliminated, and finally, in the case of the selected flocculant, the shelf life is extended by the dehydration of the flocculant resulting from the hydration of the coagulant.

Figure 6:
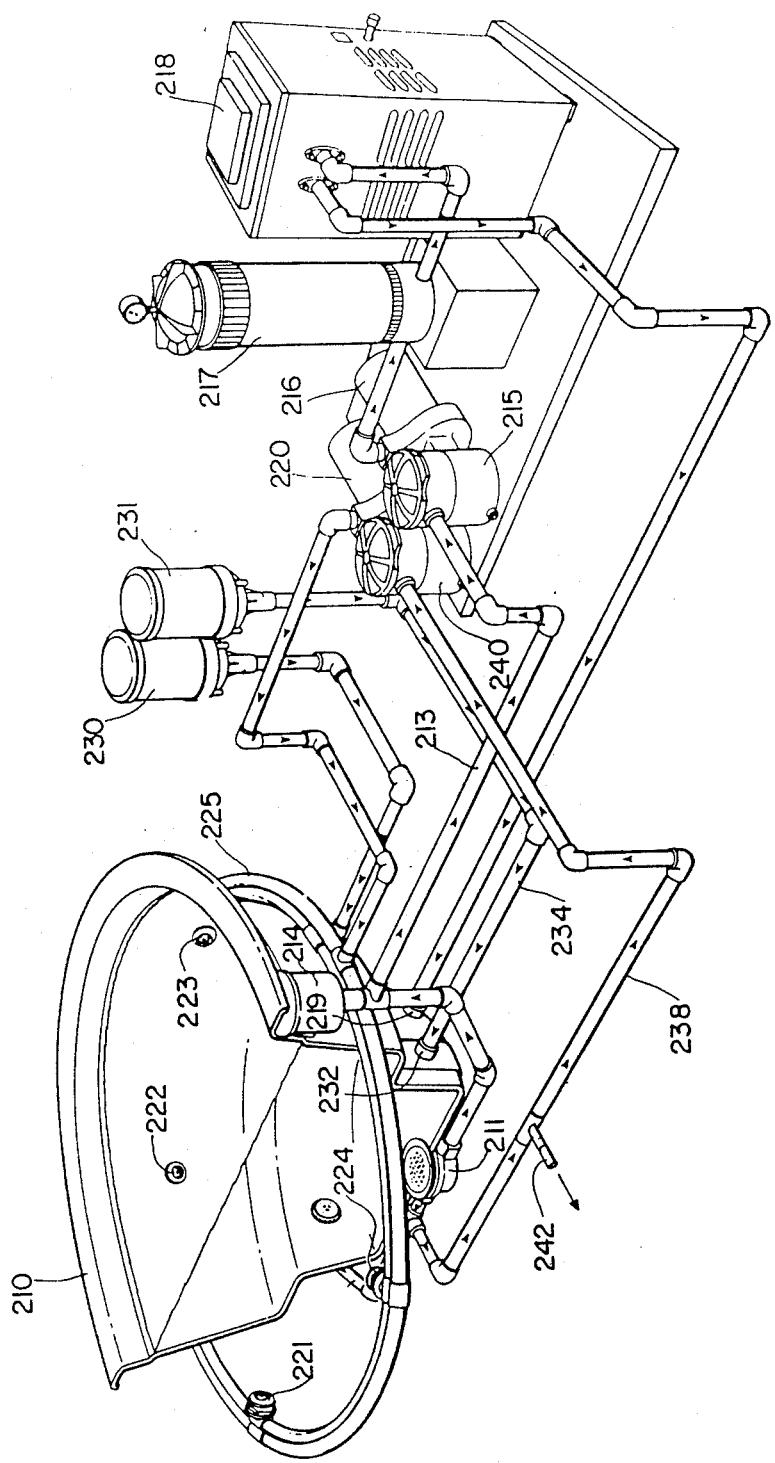
FIG. 6 is a schematic diagram of a typical home spa system as used for the invention.

FIG. 6 is a drawing representative of a so-called "spa" showing the features which characterize such systems. A descendant of Roman and Japanese baths, of the sauna, the therapeutic "whirlpool" bath, and hot springs, the spa provides a setting for communal bathing in warm water with the active stimulation of vigorous jets of water and air. The hot tub is a close relative of the spa, characterized by classical construction in the form of a large round wooden vat with a simple wooden bench. The spa, built up of concrete, tile, or fiberglass has more comfortable seating, and more flexible shape, seating arrangement, and plumbing. The spa of FIG. has all of the common features but it must be understood that in the pleasure business taste is everything - so users may do without features, or add, as the spirit moves them. The system of FIG. 6 has a tub 210 which has a main drain 211 at the bottom. Water is returned through pipe 213 from the drain 211 and a skimmer 214 to a strainer 215, and a water pump 216. From the pump 216 the water goes through a filter 217, a water heater 218, and returns to the tub at inlet 219. A second pump 220 called a "booster pump" propels water forcefully from the jets 221–224 via the pipe 225. An air pump 230 feeds air to the water jets 221–224 in a ventur connection whereby a large quantity of air is entrained in the jets of water. A second air pump 231 is connected to an air jet 232 that blows air directly into the water in the tub by way of the pipe 234. Water is returned from the tub by way of return line 238 and a strainer 240 to the booster pump 220. Supply water may be added, and the system drained by the pipe 242.

The power of the air and water pumps amounts to about ten watts per liter and is sufficient to agitate the water thoroughly. As a result, a dispensing capsule of the type described above dispenses chemicals into a spa system whether dropped into the skimmer 214 or strainer basket 215 to respond to the flow produced by the filter pump 216 or into the tub 210 to be buffeted by the water jets from the booster pump 220.

It is the vigorous activity of the water that characterizes the spas and hot tubs, clearly distinguishing them from other baths and swimming pools. I have, therefore, adopted the term "dynamic bathing system" to be generic of spas, hot tubs, whirlpool baths, and the like, regardless of the means by which the agitation is achieved. I characterize a bath as a "dynamic bathing system" if the kinetic energy of the water exceeds three joules per liter, exclusive, of course, of the energy of translation, such as that imparted when the tub as a whole is carried in a vehicle.

The amount of kinetic energy can be estimated from the pumping power applied to the system and the time it takes to reach full turbulence after the power is turned on.

Spas have many water treatment problems in common with swimming pools. Capsules filled with flocculants, chelating agents, or microbiocides are preferably applied at the skimmer basket 214 but also may be dropped into the tub. The capsule filled with a hazardous dry chemical, such as calcium hypochlorite, should be placed in the strainer basket 215.

For some feeders, such as perfume capsules of the kind illustrated in FIG. 5 and explained above as more fully set forth in my U.S. Pat. No. 4,530,120, the desired point of application is the tub itself.

It has been said that because of the high water temperature, combined with rapid water movement and aeration, bromine will not dissipate into the atmosphere as readily as chlorine. Consequently a slow-dissolving "Bromine Stick" produced by Hydrotech Chemical Corporation, similar to a chlorine stick is popular among hot tub and spa owners.

Bromine compounds are now widely used in spas and hot tubs. They are less volatile than chlorine and the common by-products in the water, the bromamines, are better bactericides than the chlorine counterparts, the chloramines. A very promising disinfectant system is a two-part system wherein sodium bromide, a relatively cheap and stable chemical, is added in bulk to the water, then OXONE potassium peroxymonosulfate is added at a controlled rate by a feeder adapted for the purpose. The potassium peroxymonosulfate, a strong oxidizing agent, oxidizes the bromide to free bromine and bromamines, all of which are good disinfectants. As the free bromine is used up in disinfecting reactions, it may reduce back to the bromide ion, thus offering the potential for maintaining a largely self-replenishing semi-permanent bank of bromide which is drawn upon to become the active disinfectant (bromine) by reaction with OXONE.

Figure 7:
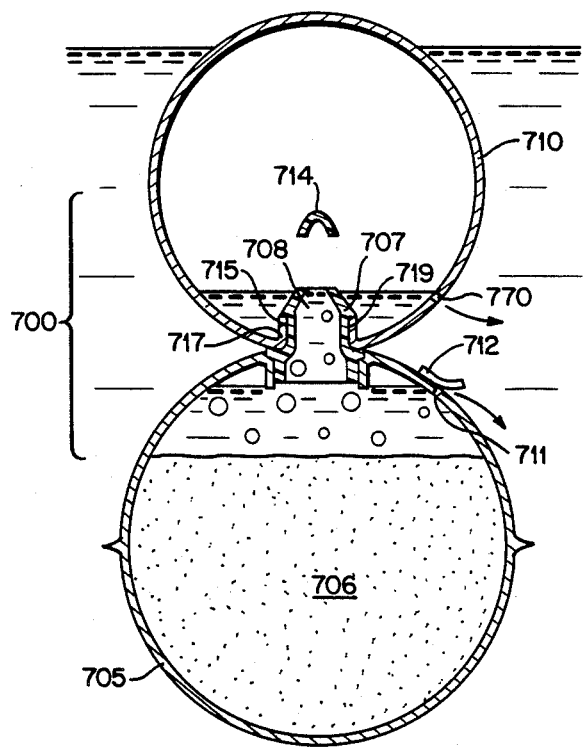
FIG. 7 is a drawing of a section through the preferred embodiment of a dumbbell feeder illustrating its function with OXONE.

FIG. 7 illustrates a composite "dumbbell" feeder 700 which is made up of a capsule 705 constructed substantially as shown in FIG. 5 and described above. The capsule is filled with a charge of OXONE powder, then permanently closed by cementing or ultra-sonic welding the connector 707. The filled feeder is supplied to the user along with a similar empty blown plastic float 710. The OXONE powder may evolve oxygen during shipment and storage, so it is necessary that the capsule 705 be shipped with a pressure-relief hole 711 which acts as a dispensing hole during use. The OXONE powder reacts with water. Accordingly, it may be desired to cover the hole 711 with a pressure-sensitive adhesive closure tape 712, which will tend to function as a check valve to limit the amount of breathing and induction of water vapor by the capsule due to changes in temperature and ambient pressure. The commercial packaging of the feeder is by a so-called Stretch-Pak method whereby the product is held in a cardboard card between sheets of vinyl chloride plastic which, when heated, first stretches, then shrinks firmly over the product. This packaging also functions as a check valve over the hole 711 to limit the amount of breathing and induction of water vapor. The producer, DuPont recommends that persons handling OXONE should avoid contact with skin, eyes or clothing, and wearing plastic-coated gloves and safety goggles. The user prepares the feeder 705 for use by removing the tape 712 or vinyl cover, cutting off the tip 714 of the connector (symbolically indicated by the detachment in FIG. 7), then dipping the feeder 705 into water to introduce water to start the solution of the OXONE, then the two spheres are joined together by inserting the connector 707 into the access hole 715 of the float 710. The skirt 717 of the hole 715 snaps around the neck 719 of the connector 707, making the interconnection tight and permanent. The feeder is then placed into a spa, hot tub, and the water creates an acidic solution which releases carbon dioxide $CO_2$, which rises via the passage 709 thru the connector 707 and escapes by the vent 770 in the float 710. At the same time, the water dissolves the OXONE and becomes substantially saturated. The motion of the water in the spa or hot-tub extracts the saturated OXONE solution at a substantially constant rate through the hole 711 because the dumbbell feeder rotates randomly about its generally vertical axis. The rate of feeding may be increased by adding additional feed holes (not shown) to the dispenser.

Figure 8:
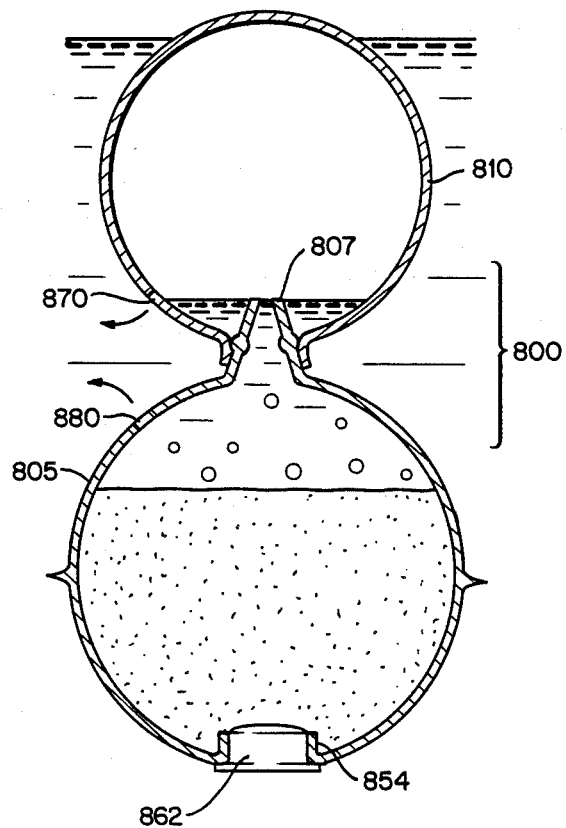
FIG. 8 is a drawing of an alternative dumbbell feeder capsule in use.

Since OXONE is a dry chemical, it might be supposed that it might be dispensed using a feeder of the kind shown in FIGS. 3 or 4 and as explained above. Indeed, the formation of the OXONE in the form of a ball briquette, packaged as shown in FIG. 3 (with a sufficient float 124 to recover the feeder when the OXONE is depleted) is a means for the dispensing of the OXONE, and might be the preferred embodiment if OXONE were readily and commercially available in the form of ball briquettes. OXONE shows a great proclivity to form briquettes and for that reason, DuPont Company in formulating the white, "granular, free-flowing powder", the active oxidizing ingredient of which is potassium monopersulfate, $KHSO_5$, identified by the registered mark OXONE it adds a small percentage of magnesium carbonate to the potassium peroxymonosulfate which it terms a "stabilized", and which make the composition much easier to deal with in most applications. Accordingly potassium peroxymonosulfate is not presently made available as the substantially pure compound. When it is attempted to use the commercial OXONE formulation in the manner above-described for dispensing a dry chemical, or a water-soluble chemical, the presence of the magnesium carbonate interferes with the normal function of the system. As carbon dioxide gas is generated from the magnesium carbonate, it creates a foamy lump of OXONE slurry, which eventually, pushes against and clogs the feeder hole 711 or holes. .pa FIG. 8 is an alternative construction for the dumbbell feeder 800 in which the connecting point 807 is blown integrally with the capsule 805 and is snapped to join with a mating float 810, the filling hole 854 and filler plug 862 being situated at the opposite pole from the connecting point 807. The $CO_2$ escapes at a vent 870 in the float 810. The monopersulfate exiting through the feeder hole 880.

OXONE can also be used as an auxiliary oxidant ("shocking agent") in swimming pools and spas for the purpose of reducing the organic content of the water. The treatment, which is generally recommended at two-week intervals or whenever cloudiness is present, increases the clarity of the water and reduces eye burn and "chlorine" odor by destroying chloramines. For this purpose it has been practical to broadcast the recommended amount of the OXONE powder or to dump it into the filter basket. A superior mode of introducing the potassium peroxymonosulfate would be by means of a feeder capsule full of a ball briquette of the chemical dropped into the skimmer basket.

Unlike chlorine-based shocking agents which super chlorinate the pool, potassium peroxymonosulfate does not significantly increase the chlorine level. Therefore the pool need not be closed when it is introduced in the safe effective way by a feeder capsule of FIG. 2 applied to an intermediate-velocity-chamber of FIG. 1. Used in this way the OXONE compound or potassium peroxymonosulfate is not a disinfectant and some other safe disinfectant may be required.

The potassium peroxymonosulfate/sodium-bromide system operates by the mechanism of the monopersulfate oxidation of the bromide ion to bromine. The bromine hydrolyzes in water to form hypobromous acid (HOBr). The bromine reacts with nitrogen compounds to form bromamines, which have germicide efficiency similar to that of hypobromous acid itself, and free available bromine. When these are used up in disinfecting reactions, they revert to bromide ion. Thus the spa or hot tub needs to be dosed with sodium bromide only as make-up water is added to the system. The usage of the sodium bromide is not proportional to the organic loading of the system. On the other hand, the usage of OXONE is proportional to the biological loading the spa or hot tub. Accordingly it may sometimes be preferable to make the tub itself the point of application of the OXONE, so that the germicidal effect is the greatest when the air pumps and booster pumps are running, and less when only the main pump 216 is in operation.

As pointed out above, the invention is not for large quantities of chemicals, where mechanical feeders may be more cost effective. In more than a decade of use, the feeder as shown in FIG. 5 and of 2 ¾ inch diameter has proven to be practical and effective for the great majority of users. Smaller feeders of that type have found usage in the control of scale and slime in small humidifiers for home use, and for the control of algae in aquaria. Larger feeders as shown in FIG. 2 of volume up to 70 cubic inches have found useful for the control of slime, corrosion and scale in cooling towers, and for the application of flocculants to large public swimming pools.

I deem the preferred embodiment of the method to employ a feeder comprising a seamless shell, substantially spherical, blown of thermoplastic material, having at one pole of an imaginary sphere approximating said shell, an indented filling hole formed in said shell with a substantially cylindrical sidewall normal to the surface of said shell, for filling with a dose of chemical, having on the equator of said sphere a pair of diametrically opposed stub wings integral with said shell and lying in the equatorial plane thereof, to assist said feeder to move about and roll when impacted by flowing water, said shell being perforated by a number of feed holes greater than five thousandths of an inch in diameter and less that three square millimeters in cross section to feed said chemical at a desired rate into such flowing water, wherein said feeder is a compact container of volume between onetenth cubic inch and seventy cubic inches, wherein said plastic is resistant to attack by water and said chemical, and wherein each feed hole is less than three square millimeters in cross section and the surface area of said feeder is more than five-thousand times greater than the aggregate area of said number of holes.

Having thus described the methods and apparatus of the invention, a catalog of capsules, chemicals, and their uses may be pertinent:

Type A. PVC or blow-molded, high-density polyethylene 2.75" in diameter filled with alum and a small proportion of ultra-high-molecular-weight flocculant "MAGNIFLOC 985N", made by American Cyanamid, or filled with other dry chemicals, such as sodium bisulfate or sodium carbonate—one to four feed holes 0.026", for use in swimming-pool strainer or skimmer baskets.

Type B. Blow-molded, high-density polyethylene capsule filled with low-molecular weight liquid cationic polymer flocculant solution, "MAGNIFLOC 572C", made by American Cyanamid. Two or three feed holes 0.026" for use in swimming-pool skimmer baskets or spas. Capsules of 2.75" and 2.0" diameters are for pool and spa, respectively.

Type AB. PVC or blow-molded, high density polyethylene, with a charge consisting of dry granular alum as for Type A, to which is added a quantity of the liquid flocculant solution of Type B, the amount of liquid being the stoichiometric amount so that the water is completely taken up in hydrating the alum, leaving a solid dry mass in the bottom of the feeder. This is deemed the preferred embodiment of the invention.

Type C. PVC or blow-molded, high-density polyethylene, 2.75", 2.0", or 1.5" diameter capsule filled with nitrilotriacetate, NTA, and ethylenediaminetetraacetate, EDTA, made by W. R. Grace and Co., or filled with polyacrylate polymers such as "CYANAMER P-70" (anionic polyacrylamide) made by American Cyanamid. The chelating agents and antiscalant inactive scale and scum-causing metallic ions, such as calcium and magnesium. Placed in a strainer or skimmer basket of a pool or spa, the chemical treats first the piping, heater and pumps where most needed. The smallest capsule filled with P-70 is used in small air washers and humidifiers as an antiscalant.

Type D. Microbiocide. Like all capsules, unless otherwise specified, 2.75" diameter of blow-molded, high-density polyethylene, filled with 30-60% concentrations of microbiocide, poly[oxyethylene(dimethylimini-o)ethylene (dimethyliminio) ethylenedichloride] made by Buckman Laboratories. Applied to a skimmer basket of a pool or spa, or sump of a cooling tower to control algae. Smaller capsule, 1.5" diameter, is used for algae, bacteria, and fungi control in air washers and humidifiers. Small feed holes, up to 0.1% of feeder surface aggregate area.

Type E. Evaporation retarder and heat retainer. Blow-molded high-density polyethylene. Contains a dispersion of cetyl alcohol in water which spreads to form a molecular layer over the water. Weighted, it is placed in a pool, tub, or skimmer basket, dispensing a small quantity of the chemical whenever the surface is disturbed. Reduces humidity problems and heating costs for indoor pools.

Type F. Defoaming. Blow-molded polyethylene 2" diameter capsule filled with 10% active concentration of defoaming agent such as FG-10 (Food grade) emulsion antifoam made by Dow Corning Company. Placed in a skimmer basket or tub of a dynamic bathing system, it suppresses the formation of suds.

Type G. Germicide. Blow-molded polyethylene feeder contains germicide for dynamic bathing system and swimming pool systems, filled with dry chlorine chemical, for example calcium hypochlorite, lithium hypochlorite, trichloro-s-triazinetrione, sodium dichloroisocyanurate or potassium dichloroisocyanurate to feed into the water of a strainer in a swimming pool or spa or hot tub.

Type H. Microbiocide. Blow-molded polyethylene filled with 30% active ingredients, 15% sodium dimethyldithiocarbamate and 15% "NABAM" made by Alco Chemical Co. For cooling towers and the like.

Type I. Stain and scale controller. Blow-molded polyethylene capsule filled with "DEQUEST 2010" phosphonate (1-hydroxyethylidene-1-diphosphonic acid) made by Monsanto Chemical Company. Placed in skimmer in a swimming pool or spa or hot tub.

Type J. Stain and scale controller. Blow-molded, high-density polyethylene 2.75 or 3.5 inches in diameter. Filled with a blend of phosphonates and triazoles, nonferrous metal corrosion inhibitors. Placed in sump of cooling tower or the like.

Type K. For scale and corrosion in general-service water. PVC 3.5 inch diameter filled with ball briquette of 3" diameter, NALCO 936, a blend of polyphosphates and polyvalent ions.

Type L. For lawn sprinklers. PVC 3.5" or high-density polyethylene 2.75" diameter filled with either briquette or solid garden chemicals such as fungicides, herbicides, insecticides, wetting agents, fertilizers, and micronutrients, such as chelated iron, manganese, copper and zinc. Feed hole size may be as much as 0.2% of feeder surface.

Type M. For marine bilges. Blow-molded polyethylene feeder containing a nonionic surfactant such as produced by Sudbury Laboratories, Sudbury, MA. The rate of feeding increases with the amount of rolling and pitching of the craft.

Type N. For nurseries. A weighted feeder of blow-molded high-density polyethylene, contains a solution of 7-12-6 fertilizer fortified with micronutrients iron, zinc, manganese, copper, boron, magnesium, and molybdenum. The solution has a color which indicates depletion. Placed in watering can, the feeder rests with feed holes up when not in use. Chemical is added when the water is disturbed. When the chemical is depleted, the feeder floats to the water surface.

Type O-O, dumbbell dispenser 2.75" diameter blow-molded feeder filled with OXONE compound, linked by connector tube to 2.25" diameter blow-molded float, for use with sodium bromide to control bacteria in spas and hot tubs.

Type P. Perfume. Blow-molded polyethylene filled with emulsion of perfume oil, mineral oil, isoprcpyl myristate, and a spreading agent such as a polyoxyethylene polyol fatty acid ester. Weighted, and with air for floatation, the feeder spreads perfume on the surface of a pool or tub only when in use.

Type Q. Coloration. Blow-molded polyethylene feeder filled with a solution of FDA-approved food color to tint the water of a dynamic bathing system blue or blue-green. Because the chlorine and bromine in the system gradually bleach out the color, it needs to be gradually made up by a feeder in the tub or skimmer basket.

Type R. Repellant. Similar to the Type P perfume feeder, this feeder is floated on an outdoor swimming pool to spread a molecular layer of insect repellant across the water surface in proportion to wave action, which approximates the need.

Type S. For slimes and algae. Blow-molded polyethylene, 2.75", 2.0", or 1.5" diameter capsule filled with simazine, 2-chloro-4,6-bis(ethylamino)-s-triazine made by CIBA-GEIGY Corporation, for cooling towers, fish ponds, and aquariums, etc.

It will be understood that this list is not comprehensive of the invention, which will also embrace modifications, combinations, and variations of the invention which have been defined by the claims in the above-referenced patents and applications and asserted herein and annexed hereto.

I claim:

1. A process for feeding water-treatment chemicals into a water system comprising the steps of:

providing a feeder in the form of a substantially spherical shell of waterproof plastic of substantially neutral buoyancy having an upper hemisphere with a filler port and closure therefore, and a number less than 26 of feed holes greater than five-thousandths of an inch (0.005") in diameter and less than three square millimeters in cross section;

containing a dose of water-treatment chemicals and having a number and size of said holes selected to provide a desired rate of feeding of said chemical;

placing said feeder so as to be free to move about and roll within an intermediate velocity chamber of said water-treatment system which also includes a body of water and means to cause a flow of water of said body through said system; and subjecting said feeder to said flow thereby to extract said chemicals at a substantially uniform rate into said water, wherein said dose consists essentially of a charge of a first water-soluble treatment chemical which is introduced through said port into the top of said feeder in a dehydrated granular form, said first chemical being capable of taking up and forming a weak chemical bond with a substantial amount of water, and a second treatment chemical which is supplied in aqueous solution, added to said first chemical in said feeder to create with said first chemical, a substantially homogeneous mass adherent to the bottom of said feeder, and whereby in the absence of said flow, said feeder is urged by said mass to repose with said number of holes upward, thereby substantially to stop the feeding of said chemicals.

2. The process of claim 1, wherein said feeder comprises:

(a) a seamless shell, substantially spherical, blown of thermoplastic material, (b) having at one pole of an imaginary sphere approximating said shell, an indented filling port formed in said plastic, and having substantially cylindrical walls normal to the surface of said shell, for filling with a dose of chemical, (c) having on the equator of said sphere a pair of diametrically opposed stub wings integral with said shell and lying in the equatorial plane thereof, to assist said feeder to move about and roll when impacted by flowing water, (d) said shell being perforated by at least one feed hole greater than five thousandths of an inch (0.005") in diameter to feed said chemical at a desired rate into such flowing water.

3. A process for enhancing filterability in a water system comprising the steps of:

providing a feeder in the form of a compact shell of water-proof plastic of substantially neutral buoyancy having in its top a filler port and closure therefor, and a number of feeder holes greater than five thousandth of an inch (0.005") in diameter and less than three square millimeters in cross section;

containing a dose of water-treatment chemicals and wherein said number and the size of said holes provide a desired rate of feeding of said chemicals;

placing said feeder so as to be free to move about and turn within an intermediate velocity chamber of said water system which also includes a body of water and means to cause a flow of water of said body through said system; and subjecting said feeder to said flow thereby to extract said dose at a substantially uniform rate to treat said water, wherein said dose consists essentially of a charge of a dry, granular inorganic coagulant loaded through said filler hole, and a quantity of organic polymer flocculant in aqueous solution added to said coagulant in an effective quantity to consolidate said coagulant into a solid mass adherent to the bottom of said feeder, and whereby in the absence of said flow, said feeder is urged by said mass to repose with said number of said holes upward, thereby substantially to stop the feeding of said dose.

4. A process for enhancing filterability in a water system as set forth in claim 3, wherein said dose consists essentially of a charge of a dry, granular alum loaded through said filler hole, and said polymer flocculant is substantially a liquid cationic polymeric flocculant dissolved in an amount of water which, when added in situ to said alum is substantially immobilized by the resulting hydration of said alum, whereby said dose becomes a dry water-soluble solid with said flocculant and coagulant bonded together in proportions in a substantially homogeneous mass.

5. The process of claim 4, wherein said feeder comprises:

(a) a seamless shell, substantially spherical, blown of thermoplastic material, (b) having at one pole of an imaginary sphere approximating said shell, an indented filling port formed in said plastic, and having substantially cylindrical walls normal to the surface of said shell, for filling with a dose of chemical, (c) having on the equator of said sphere a pair of diametrically opposed stub wings integral with said shell and lying in the equatorial plane thereof, to assist said feeder to move about and roll when impacted by flowing water, (d) said shell being perforated by at least one feed hole greater than five thousandths of an inch (0.005") in diameter to feed said chemical at a desired rate into such flowing water.

6. The process of claim 3, wherein said feeder comprises:

(a) a seamless shell, substantially spherical, blown of thermoplastic material, (b) having at one pole of an imaginary sphere approximating said shell, an indented filling port formed in said plastic, and having substantially cylindrical walls normal to the surface of said shell, for filling with a dose of chemical, (c) having on the equator of said sphere a pair of diametrically opposed stub wings integral with said shell and lying in the equatorial plane thereof, to assist said feeder to move about and roll when impacted by flowing water, (d) said shell being perforated by at least one feed hole greater than five thousandths of an inch (0.005") in diameter to feed said chemical at a desired rate into such flowing water.

7. A process for maintaining an effective level of bromine germicides in the water of a bathing system comprising the steps of:

providing an effective concentration of bromide ion by adding a suitable alkali metal bromide to said water, providing a feeder in the form of a compact shell of waterproof plastic having in its top a filler port and closure therefor, and a number of feeder holes greater than five thousandth of an inch (0.005") in diameter and less than three square millimeters in cross section;

containing a dose of an oxidizing agent chemical comprising potassium peroxymonosulfate and wherein said number and thesize of said holes yield a desired rate of feeding of said dose;

placing said feeder so as to be free to move about and turn within an intermediate velocity chamber of said water system which also includes a body of water and means to cause a flow of water of said body through said system; and said chemical at a substantially uniform rate, wherein said dose consists essentially of a charge of a dry, granular composition loaded through said filler port, which, when wetted forms a mass adherent to the bottom of said feeder, and wherein said feeder is so weighted and buoyed that in the absence of said flow said feeder is urged by said mass to repose with said number of said holes upward, thereby substantially to stop the feeding of said chemicals.

8. The process of claim 7, wherein said feeder comprises:

(a) a seamless shell, substantially spherical, blown of thermoplastic material, (b) having at one pole of an imaginary sphere approximating said shell, an indented filling port formed in said plastic, and having substantially cylindrical walls normal to the surface of said shell, for filling with a dose of chemical, (c) having on the equator of said sphere a pair of diametrically opposed stub wings integral with said shell and lying in the equatorial plane thereof, to assist said feeder to move about and turn when impacted by flowing water, (d) said shell being perforated by at least one feed hole greater than five thousandths of an inch (0.005") in diameter to feed said chemical at a desired rate into such flowing water.

9. The process of claim 7, wherein said feeder comprises:

(a) a first seamless shell, substantially spherical, blown of thermoplastic material, i. having at one pole of an imaginary sphere approximating said shell, an indented filling port formed in said plastic, and having substantially cylindrical walls normal to the surface of said shell, for filling with said dose of chemical, ii. having on the equator of said sphere a pair of diametrically opposed stub wings integral with said shell and lying in the equatorial plane thereof, to assist said feeder to move about and turn when impacted by flowing water, iii. said shell being perforated by at least one feed hole greater than five thousandths of an inch (0.005″) in diameter to feed said chemical at a desired rate into such flowing water and, (b) a second substantially spherical shell,
attached said first shell at said filler port to provide a float to collect a gas evolved from said chemicals thereby to enhance the tendency of said feeder to shut off feeding when flow velocity is reduced, and to facilitate the releasing of said gas from said chemical in solution.

* * * * *